US 9,856,991 B2

(12) United States Patent
Williams (10) Patent No.: US 9,856,991 B2
(45) Date of Patent: Jan. 2, 2018

(54) FLUSH CAP FOR A VALVE ASSEMBLY

(71) Applicant: Kohler Co., Kohler, WI (US)

(72) Inventor: Steven D. Williams, Plymouth, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 15/236,053

(22) Filed: Aug. 12, 2016

(65) Prior Publication Data

US 2017/0051840 A1 Feb. 23, 2017

Related U.S. Application Data

(60) Provisional application No. 62/207,155, filed on Aug. 19, 2015.

(51) Int. Cl.
| F16L 35/00 | (2006.01) |
| F16K 27/12 | (2006.01) |
| E03C 1/02 | (2006.01) |

(52) U.S. Cl.
CPC ............ *F16K 27/12* (2013.01); *E03C 1/021* (2013.01); *E03C 1/023* (2013.01)

(58) Field of Classification Search
CPC ......... Y10T 137/3755; Y10T 137/7062; E03C 1/021; F16K 27/12
USPC ........ 137/233, 377, 381, 382; 285/305, 307; 138/40, 44, 46, 96 T
See application file for complete search history.

(56) References Cited

U.S. PATENT DOCUMENTS

| 5,141,017 | A | | 8/1992 | Trottier |
| 5,247,963 | A | | 9/1993 | Hostetler et al. |
| 5,497,802 | A | | 3/1996 | Whiteside |
| 5,588,459 | A | | 12/1996 | Ellis |
| 5,666,990 | A | * | 9/1997 | Wu ............ B60S 5/04 137/223 |
| 5,901,387 | A | | 5/1999 | Fan |
| 5,967,350 | A | * | 10/1999 | Jones ............ B65D 41/06 116/309 |
| 6,761,184 | B1 | | 7/2004 | Jordan |
| 7,063,098 | B2 | | 6/2006 | Sprague |
| 7,775,234 | B2 | | 8/2010 | Campisi |
| 2004/0261849 | A1 | | 12/2004 | Sprague |
| 2004/0261864 | A1 | | 12/2004 | Coll |

(Continued)

FOREIGN PATENT DOCUMENTS

DE 20 2010 016 881 A1 11/2011
EP 2 899 320 A1 7/2015

OTHER PUBLICATIONS

Extended European Search Report issued in corresponding application No. 16184122 dated Jan. 25, 2017.

*Primary Examiner* — Reinaldo Sanchez-Medina
(74) *Attorney, Agent, or Firm* — Foley & Lardner LLP (57) ABSTRACT

A flush cap for a valve body includes a substantially flat base and annular inlet portion. The substantially flat base has opposite first and second sides. The annular inlet portion extends from the first side. The annular inlet portion is configured to engage a bore in the valve body. The annular inlet portion includes an inlet bore and a tab. The tab extends from an outer surface of the annular inlet portion in a radial direction relative to a longitudinal axis of the annular inlet portion. The tab is configured to selectively engage the valve body to detachably couple the flush cap to the valve body.

19 Claims, 4 Drawing Sheets

(56) References Cited

U.S. PATENT DOCUMENTS

2005/0199572 A1* 9/2005 Brozell ............. B65D 41/0471
 215/218
2012/0211091 A1 8/2012 Carter et al.

* cited by examiner

FLUSH CAP FOR A VALVE ASSEMBLY

CROSS-REFERENCE TO RELATED PATENT APPLICATION

This application claims the benefit of U.S. Provisional Patent Application No. 62/207,155, filed Aug. 19, 2015, which is incorporated herein by reference in its entirety.

TECHNICAL FIELD

The present application relates generally to plumbing tools, plumbing fittings and the like, used to remove debris from water distribution and piping systems. Specifically, the present application relates to plumbing tools and plumbing fittings used to controllably remove debris from potable water plumbing pipes, plumbing valves and other plumbing valve such as for use with, a faucet, a sprayer, toilets, latrines, urinals, drinking fountains, eye wash stations, emergency showers, showers, shower heads, shower pans, steam showers, saunas, laundry faucets, utility faucets, bath tubs, spas, sinks, water dispensers, as well as many other fixtures and/or systems used in residential and commercial plumbing applications.

BACKGROUND

In conventional plumbing systems used in residential and commercial structures, a potable water distribution system may be comprised of many lengths of plumbing pipe, pipe connections, numerous water faucets and/or fixtures, hot water heaters, water softeners, water filters and various other plumbing valves, meters, etc. During the installation and connection of residential and commercial plumbing pipe, often the ends of the pipe can be left open for considerable periods of time pending the completion of the water delivery system. While the ends of the pipe are left open, various kinds of debris can enter the pipe. Further, during the installation of the plumbing pipe, the pipe is typically shoved or pushed through drilled openings in wood boards, sheetrock, etc., wherein sawdust and sheetrock particles or other debris can enter the pipe ends. It is also very common to have residual solder and flux remain within the potable water lines, used in making the welds required to seal the pipes at each joint, coupling and bend. The installation of sprinkler and yard lines, water softeners, water purification systems, filters and other external apparatus also creates the potential for the entry of various kinds of debris into the potable water lines. Additionally, should there ever exist a temporary opening or unintended break (i.e., a burst, puncture or rupture) in these plumbing pipes, caused for example during freezing weather, repair of the pipe, the additional installation of other pipe or valves or during maintenance of the pipe, a variety of debris including solder, polyvinyl chloride (PVC) glue, sand, silt, dirt, wood shavings, saw dust, copper shavings and other debris can enter the pipe opening. Even without the existence of a temporary or unintended opening in the plumbing pipe, inherent debris associated with potable water, such as sand, silt and rock particles, will normally enter the residential and commercial potable water lines from the water source and become trapped in the water delivery lines. The normal flow of water within these potable water lines generally transports the debris toward the nearest water faucet or other water pressure relief valve. Over time and in the absence of regular flushing of the potable water delivery lines, debris builds up in the water lines generally adjacent to the water faucets and valves, and eventually restricts the flow of water through the faucet or valve. This problem is especially troublesome with tub faucets and/or shower heads, which results in decreased water pressure through the tub faucet and/or shower head, often requiring additional time for the enjoyment and completion of baths and showers, inefficient bathing and rinsing, and other problems.

A need exists for a flush cap for a valve assembly that can be installed without the use of tools, such that the flush cap is retained within the valve body once installed. This flush cap would allow for operators to, simply and efficiently, install and remove a flush cap that holds a tight seal when coupled with the valve body.

SUMMARY

One implementation of the present disclosure is a flush cap for a valve body includes a substantially flat base and annular inlet portion. The substantially flat base has opposite first and second sides. The annular inlet portion extends from the first side. The annular inlet portion is configured to engage a bore in the valve body. The annular inlet portion includes an inlet bore and a tab. The tab extends from an outer surface of the annular inlet portion in a radial direction relative to a longitudinal axis of the annular inlet portion. The tab is configured to selectively engage the valve body to detachably couple the flush cap to the valve body.

Another implementation of the present disclosure is a valve assembly. The valve assembly includes a valve body and a flush cap. The valve body defining a bore configured to dispense a fluid. The flush cap is configured to detachably engage the valve body. The flush cap includes a substantially flat base, an annular inlet portion, and an annular outlet portion. The substantially flat base has opposite first and second sides. The annular inlet portion extends from the first side. The annular inlet portion is configured to engage the bore of the valve body. The annular inlet portion includes an inlet bore and a tab that extends from an outer surface of the annular inlet portion in a radial direction relative to a longitudinal axis of the annular inlet portion. The annular outlet portion extends from the second side. The annular outlet portion includes an outlet bore that is in fluid communication with the inlet bore. The flush cap is rotatable relative to the valve body about the longitudinal axis between a locked position, in which the tab engages a recess of the valve body to couple the flush cap to the valve body, and a non-locked position, in which the flush cap is decoupled from the valve body.

Another implementation of the present disclosure is a flush cap for installing in a valve body. The flush cap includes a substantially flat base and an annular inlet portion. The substantially flat base has opposite first and second sides. The second side includes a projection. The annular inlet portion extends from the first side. The annular inlet portion is configured to engage a bore in the valve body. The annular inlet portion includes an inlet bore and a tab. The projection is graspable to cause a rotation of the flush cap in the valve body. Causing a rotation of the flush cap does not require the use of any tools. The tab extends from an outer surface of the annular inlet portion in a radial direction relative to a longitudinal axis of the annular inlet portion. The tab is configured to selectively engage the valve body to detachably couple the flush cap to the valve body.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in a number of devices for various types of applications or systems.

Generally, all water faucets, fixtures and valves are susceptible to clogging, but because of the advanced engineering in pressure balance valves, these types of valves are more susceptible to clogging than non-pressure balance valves. The water inlets in pressure balance valves are typically smaller, which make them more susceptible to clogging. In particular, the removal of debris from the potable water delivery pipes fluidically engaged with a bathtub and shower pressure balance valve is especially problematic. Depending upon the applicable regulations of the state where the particular pressure balance valve is installed should there occur a leakage of a substantial amount of irretrievable water within the structure; there may be mandatory requirements to initiate immediate mold remediation action. Presently, when water flow becomes restricted through pressure balance valves, plumbers typically replace the cartridge without attempting to flush the lines, thereby avoiding the possibility of water leakage, mold and mildew occurrence within the structure.

Unfortunately, replacing only the cartridge does not normally remove the accumulated debris from the plumbing lines and valve housing. If after several cartridges have been replaced and the water restriction remains, in the absence of using a device as disclosed in the present application, the valve housing and/or the delivery pipe may need to be manually cleaned or replaced, thus possibly requiring the destruction of wall tile and sheetrock, creating great expense and inconvenience to the user of the structure. In the event that a plumber or user of the structure desires to flush a pressure balance valve and the adjacent water delivery pipe, the steps involved include: first turn off the water pressure to the structure from an outside main water valve, secondly open up the faucet valve within the structure and remove the operating cartridge from the valve, and then thirdly, reinstate the water pressure through the delivery pipe for perhaps, 1-3 seconds to quickly flush the pipe and valve assembly while attempting to limit the water leakage and/or damage within the structure. Often, this procedure must be repeated numerous times, with the end result being that the water delivery line and/or facet is still restricted with debris.

The recessed housing of most pressure balance valves is typically located completely within the interior wall of the shower stall. Thus, normally when flushing these housings and adjacent water delivery lines, in the absence of using the present invention, there is no control over the amount of water or the direction of flow of the water, through these valve housings. Additionally, this type of flushing will generally result in leakage of water and debris within the interior wall space of the shower or bathtub stall, which may create mold and/or mildew within the structure. In view of the undesirable mold and mildew insurance claims for residential and commercial structures in recent years, great caution has been used and, in some instances, penalties have been levied against plumbers in an effort to prevent interior water leakage. Additionally, flooding from the uncontrolled flow of water through a cartridge-less pressure balance valve assembly onto the floor of the structure and adjacent wall areas outside the shower stall during the flushing of water and debris, can ruin interior building materials such as sheet rock, paint, wallpaper and flooring, all resulting in expensive repairs. Moreover, the 1-3 second limited flushing of pressurized water through the water delivery lines may not be adequate to remove all of the debris within the water delivery lines and/or the faucet. Although the device of the present disclosure has unlimited application for use with flushing potable water delivery pipes, residential and commercial water faucets and valves in general, it does have specific application for use in flushing the debris which collects at or near a pressure balance valve.

Figure 1:
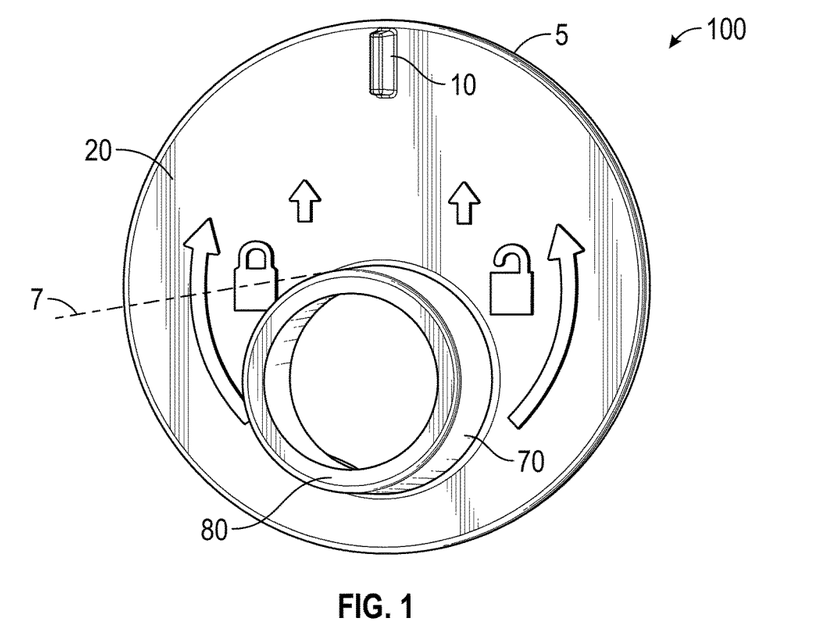
FIG. 1 is a perspective view of a flush cap for a valve body, according to an exemplary embodiment.
Figure 4:
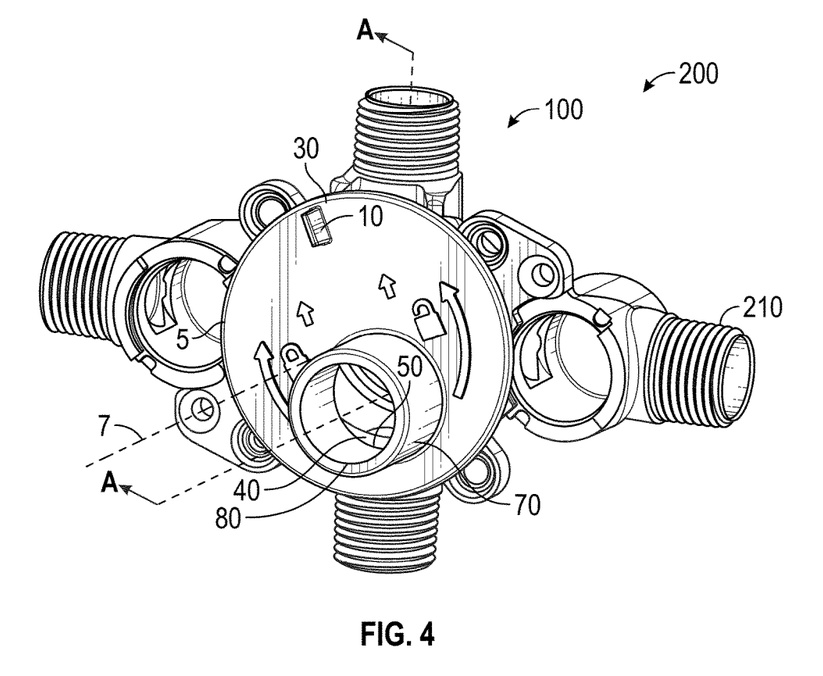
FIG. 4 is a perspective view of an exemplary embodiment of a valve assembly for a plumbing fixture.

FIG. 1 illustrates an exemplary embodiment of a flush cap 100 for use with a valve assembly, such as the valve assembly 200 shown in FIG. 4. The flush cap 100 includes a base 5, an annular inlet portion 40, and an annular outlet portion 70. The base 5 includes a first side 30, a second side 20, a projection 10, tabs 60 and a number of annular ribs 90. The annular inlet portion 40 includes an inlet bore 50 and the annular outlet portion 70 includes an outlet bore 80. In application, the flush cap 100 may be constructed from many suitable materials. For instance, the flush cap 100 may be constructed of metallic material such as a steel alloy. In other applications, the flush cap 100 may be constructed from a plastic material or other polymer blend. The first side 30 of the flush cap 100 is intended to directly mate with a valve body 210. The valve body 210 is defined by a bore configured to dispense a fluid. According to various embodiments, the bore of the valve body 210 is configured to interface with the inlet bore 50.

According to an exemplary embodiment, the second side 20 of the flush cap 100 includes the projection 10 and the annular outlet portion 70. According to an exemplary embodiment, the base 5 of the flush cap 100 is substantially flat. The projection 10 is intended to be manipulated by an operator to rotate the flush cap 100 once inserted into the valve body 210 (e.g. ¼ turn, 45 degree turn, twist lock, etc.). According to an exemplary embodiment, the flush cap 100 is rotatable between a locked position where the tab 60 engages a recess in the valve body 210 and a non-locked position where the flush cap 100 is decoupled from the valve body 210.

In various embodiments, the projection 10 is graspable (e.g., configured to be grasped, etc.) by fingers of an operator. The projection 10 may take the form of a tab, a notch, a protuberance, a raised surface or shape, or any other suitable gripping structure. In addition, the projection 10 may be inclined or wedge-shapes to provide progressively tightening engagement. According to an exemplary embodiment, the projection 10 is intended to be manipulated without the use of tools (e.g., tool-less). In an alternative embodiment, an operator may manipulate the projection 10 using a tool. According to an exemplary embodiment, the projection 10 is centered on the longitudinal axis of the flush cap 100. According to an alternative embodiment, the projection 10 may be centered at an angle between the longitudinal and latitudinal axis, such as 45 degrees. In another alternative embodiment, the projection 10 may be centered on the latitudinal axis.

Figure 2:
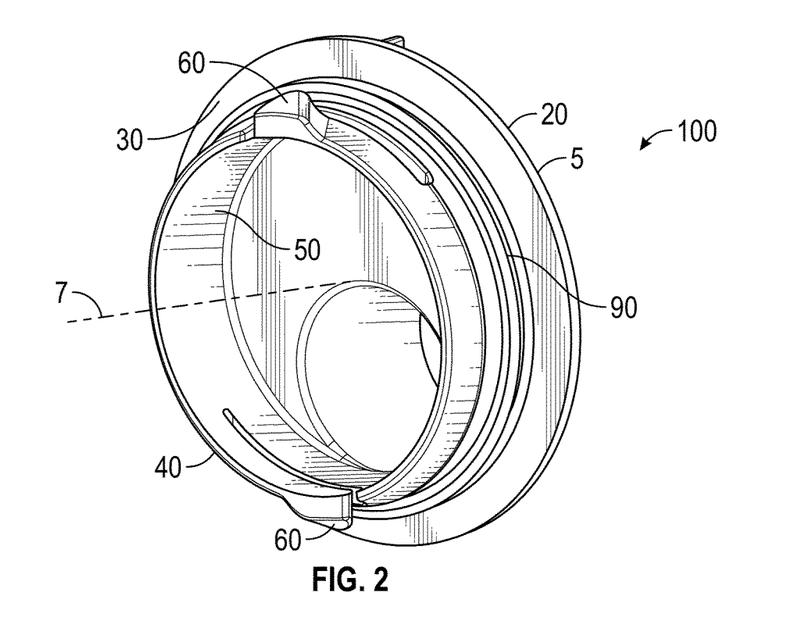
FIG. 2 is another perspective view of the flush cap shown in FIG. 1.

Referring to FIGS. 1 and 2, the annular inlet portion 40 of the flush cap 100 may be constructed to receive any suitable diameter valve body 210. Similarly, the annular outlet portion 70 of the flush cap 100 may be constructed to receive any suitable diameter flush pipe or flush hose. According to an exemplary embodiment, the annular outlet portion 70 is sized to receive any 25.4 mm (1.0 inch) diameter hose or pipe fitting. According to an exemplary embodiment, the annular outlet portion 70 is sized to review any commercially available off the shelf (COTS) PVC piping or coupling, or any other suitable conduit or coupling, to permit the extension and/or redirection of water flow in a desired direction (i.e., into a tub or drain such that the water does not come into contact with a wall). According to an exemplary embodiment, the longitudinal axis 7 of the flush cap 100 intersects the annular outlet portion 70. Similarly, in some embodiments the annular outlet portion 70 is positioned such that at least a portion of the area of a cylindrical side of the annular outlet portion 70 is contained within the area of a cylindrical side of the annular inlet portion 40. According to an embodiment, the entire area of a cylindrical side of the annular outlet portion 70 is contained within the area of a cylindrical side of the annular inlet portion 40 (i.e., the outlet bore 80 is contained within the inlet bore 50). One embodiment exists which flow of fluid through the flush cap 100 is maximized. In this embodiment, the outlet bore 80 is contained within the inlet bore 50 and the outlet bore 80 is centered laterally on the longitudinal axis 7 while being positioned as close to the group as possible, thus maximizing the effects of gravity on the fluid. Such an orientation of the flush cap 100 may be obtained in the locked position and is approximately shown, for example, in FIG. 5.

In an exemplary embodiment, a portion of the outlet bore 80 intersects a portion of the inlet bore 50. According to another alternative embodiment, a portion of the circumference of the outlet bore 80 may not be contained within the circumference of the inlet bore 50 (i.e., a portion of outlet bore 80 is outside of the inlet bore 50. The inlet bore 50 may be constructed to any suitable diameter for a given application. According to an exemplary embodiment, the inlet bore 50 is similar in diameter to the diameter of the annular inlet portion 40. According to other exemplary embodiments, the inlet bore 50 may be a lower percentage of the diameter of the annular inlet portion 40 in order to restrict flow or result in a higher outlet pressure. Similarly, the outlet bore 80 may be constructed to any suitable diameter for a given application. According to an exemplary embodiment, the outlet bore 80 is similar in diameter to the diameter of the annular outlet portion 70. According to an exemplary embodiment, a point (e.g., along the bottom) of the annular outlet portion 70 is coincident with a point (e.g., along the bottom) of the annular inlet portion 40 so that accumulation within the valve body 210 is drained resulting in no trapped standing water or debris within the valve body 210. However in an alternative embodiment, the outlet bore 80 may be a lower percentage of the diameter of the annular outlet portion 70 in order to restrict flow or result in a higher outlet pressure. According to an exemplary embodiment, the outlet bore 80 and inlet bore 50 are in fluid communication. However, according to an alternative exemplary embodiment, an amount of material (e.g., flashing, a guard, a thin wall, layer, etc.) may separate the inlet bore 50 from the outlet bore 80. According to this same alternative exemplary embodiment, the separating material may be punctured (e.g., degraded, pierced, opened, etc.) such that the inlet bore 50 and outlet bore 80 are in fluid communication. According to a similar exemplary embodiment, this amount of material may take the form of a filter or similar substrate which acts to filter and separate debris and other solid particulates.

FIG. 2 illustrates another exemplary embodiment of the flush cap 100 for use with the valve body, such as the valve body 210 shown in FIG. 4. The flush cap 100 also may include tabs 60 and a number of annular ribs 90. The tabs 60 (e.g., protuberances, knobs, bumps, protrusions, extrusions, locks, pins, fins, threads, etc.) allow the operator to install the flush cap 100 without the use of tools (e.g., in a tool-less installation, etc.), and cause the flush cap 100 to be secured to the valve body 210. According to an exemplary embodiment, the tabs 60 are cantilevered in order to aid in the retention of the flush cap 100 to the valve body 210. According to another exemplary embodiment, the tabs 60 contain detents that assist in securing the flush cap 100 to the valve body 210. The detent may extend from the tab 60 towards the second side 20 parallel to the longitudinal axis 7. The tabs 60 are configured to selectively engage the valve body 210 thus selectively coupling the flush cap 100 to the valve body 210. In this sense, the flush cap 100 is similarly selectively detachable from the valve body 210.

In various embodiments, the tabs 60 extend from an outer surface of the annular inlet portion 40. The tabs 60 may extend radially from the outer surface of the annular inlet portion 40. The radial direction may be relative to the longitudinal axis 7. In some applications, the flush cap 100 includes a plurality (e.g., two, three, four, etc.) of tabs 60. In one embodiment, the flush cap 100 includes a first tab 60 and a second tab 60 that is offset one-hundred and eighty degrees from the first tab.

The number of annular ribs 90 (e.g., threads, fins, ribs, layers, extrusions, etc.) work in conjunction with the tabs 60 to prevent fluid leakage (e.g., flow, leaks, etc.) around the flush cap 100. According to an exemplary embodiment, the number of annular ribs 90 is comprised of elastically deformable ribs that seal the flush cap 100 when the flush cap 100 is inserted into the valve body 210. In some applications, the number of annular ribs 90 extends around the length of the outer surface of the annular inlet portion 40. According to another exemplary embodiment, the number of annular ribs 90 is comprised of threads (e.g., a thread pattern, etc.) that correspond with the threads of the intended valve body 210. According to this same exemplary embodiment, one having ordinary skill in the art would understand that many different thread patterns could be implemented with the number of annular ribs 90 on the flush cap 100. According to an exemplary embodiment, the flush cap 100 is removable and replaceable such that the flush cap 100 may be reused in multiple valve bodies 210. The flush cap 100 may be sized to fit a wide variety of valve body 210 shapes and styles. According to an exemplary embodiment, the flush cap 100 is oversized relative to the valve body 210, such that a seal may be created between the flush cap 100 and the valve body 210.

Figure 3:
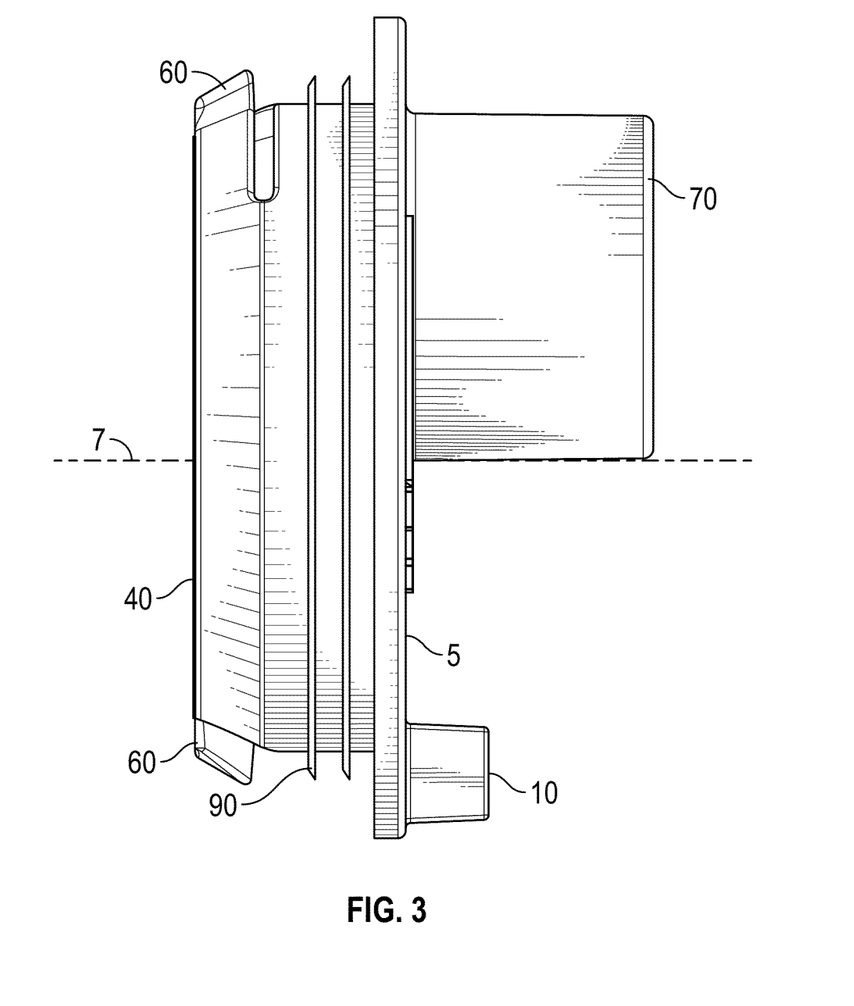
FIG. 3 is profile view of the flush cap shown in FIG. 1.

FIG. 3 illustrates a profile view of an exemplary embodiment of the flush cap 100 for use with a valve assembly, such as the valve assembly 200 shown in FIG. 4. According to an exemplary embodiment, the number of annular ribs 90 is oriented parallel to the first side 30 and second side 20 of the flush cap 100. The number of annular ribs 90 may be spaced any suitable distance away from the first side 30 of the flush cap 100. According to an exemplary embodiment, the number of annular ribs 90 may be one, such that only a single annular rib 90 is included in the flush cap 100.

FIG. 4 illustrates a perspective view of an exemplary embodiment of the flush cap 100 for use with the valve body. FIG. 4 further illustrates an exemplary manner for an operator to insert the flush cap 100 into the valve body 210. As can be seen, the flush cap 100 is inserted approximately at 45 degrees from the longitudinal axis 7 in the direction opposite the thread direction.

Figure 5:
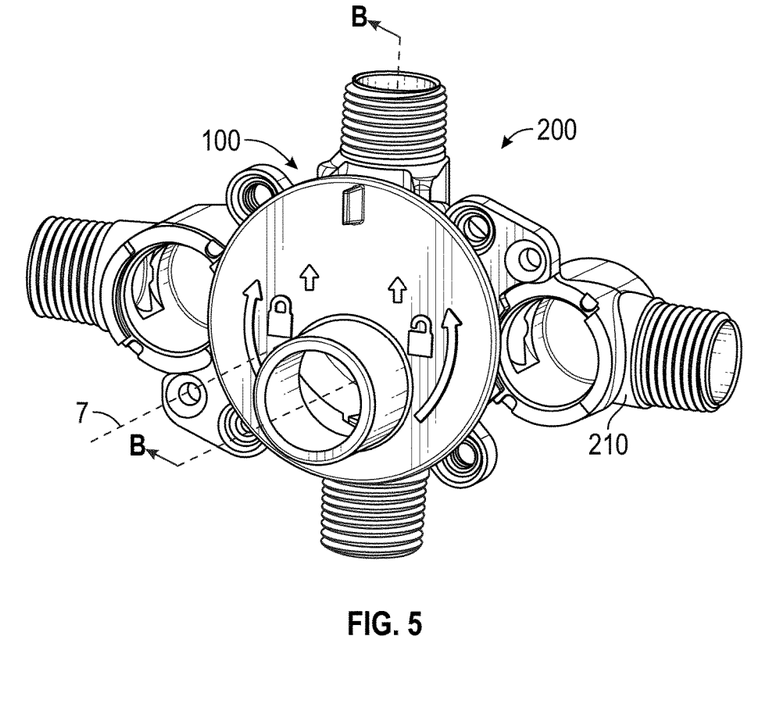
FIG. 5 is another perspective view of a valve assembly for a plumbing fixture, according to an exemplary embodiment.

Referring to FIG. 5, another perspective view of the valve assembly 200 for a plumbing fixture, according to an exemplary embodiment, is shown. FIG. 5 illustrates the flush cap 100 installed onto the valve body 210. As can be seen the projection 10 on flush cap 100 (as well as the annular outlet portion 70) is centered on the longitudinal axis 7 of the valve body 210.

Figure 6:
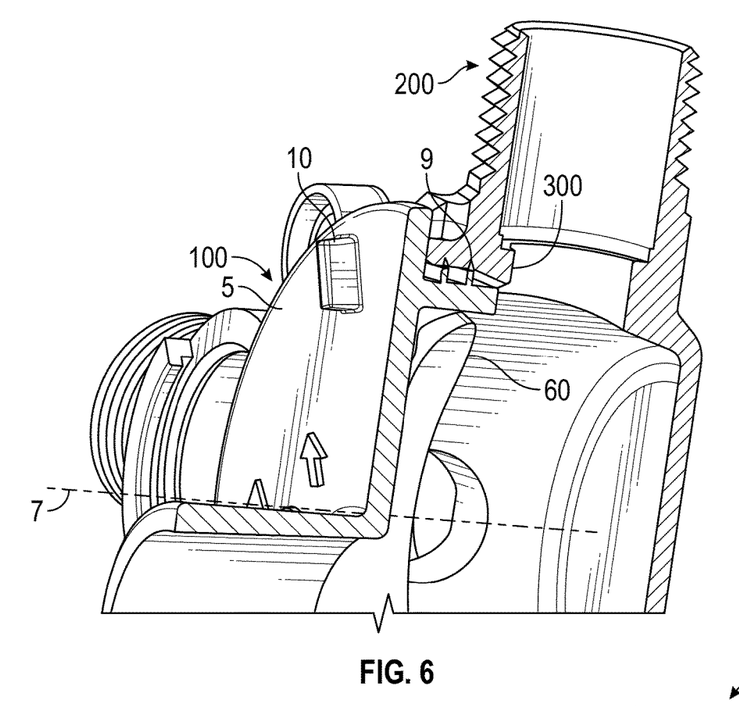
FIG. 6 is a section view the flush cap shown in FIG. 1, the flush cap installed in the valve assembly shown in FIG. 4, taken about line A-A.
Figure 7:
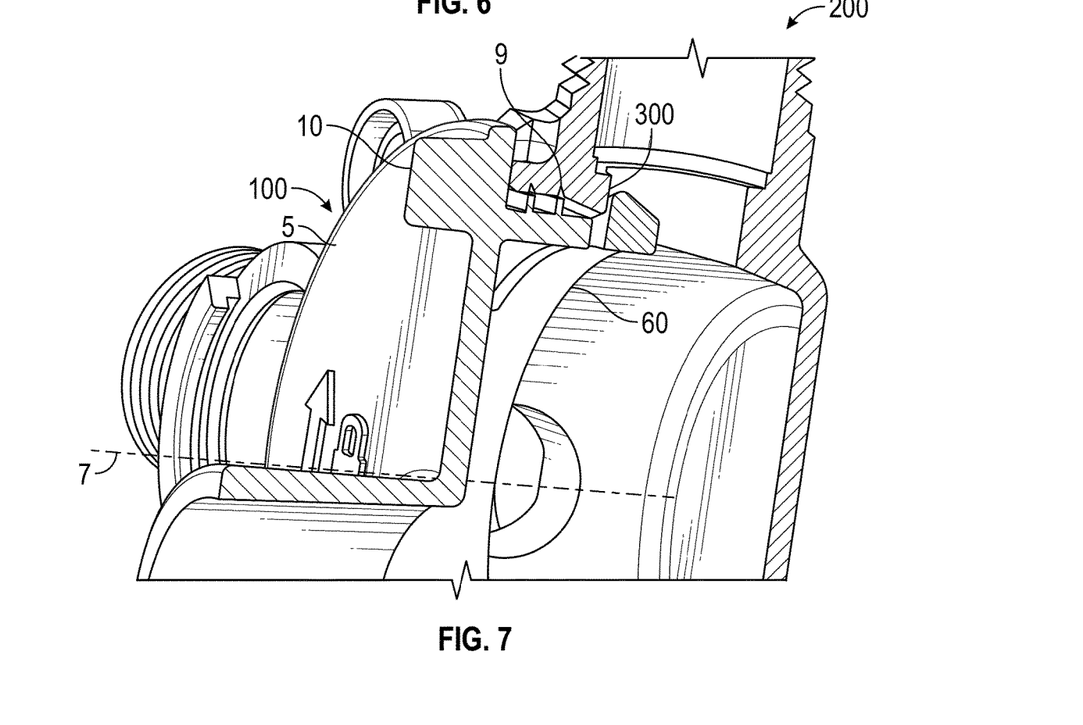
FIG. 7 is another section view of a portion of the flush cap shown in FIG. 1, the flush cap installed in the valve assembly shown in FIG. 5, taken about line B-B.

FIGS. 6 and 7 illustrate section views of an exemplary embodiment of the flush cap 100 for use with the valve assembly 200 that includes valve bodies, such as the valve body 210 shown in FIG. 4 and the valve body 210 shown in FIG. 5. According to an exemplary embodiment, the tabs 60 on the flush cap 100 secure (e.g., latch, lock, mate, etc.) to the valve body 210. According to an exemplary embodiment, when the flush cap 100 is installed, the group of number of annular ribs 90 is intended to prevent fluid leakage from the valve body 210 through the flush cap 100. According to an exemplary embodiment, the number of annular ribs 90 is plastically deformable and creates a seal between the valve body 210 and the flush cap 100 when the tabs 60 secure the flush cap 100 to the valve body 210. According to another exemplary embodiment, the valve body 210 may include threads. According to this exemplary embodiment, the group of number of annular ribs 90 of the flush cap 100 may be threads which are matched to the threads of the valve body 210. According to yet another exemplary embodiment, the valve body 210 may utilize an O-ring 300 or a seated elastomeric gasket that is replaceable to extend useful life of the device.

Referring to the figures, a flush cap 100 for a valve body 210 and a system to flush a plumbing system and/or valve body 210, is shown according to a number of exemplary embodiments. These exemplary embodiments generally include one or more removable flush caps 100 installed on one or more valve bodies 210 in a plumbing network. The flush caps 100 include an annular outlet portion 70 that facilitates the drainage of all flush water and debris from a valve body 210, and is configured to receive a suitable hose or pipe to direct the flush water and debris to a drain or our repository. The flush caps 100 may be numbered or have other suitable indicia to facilitate verification that all installed flush caps 100 are removed from their valve bodies 210 in the plumbing network before pressurizing. Similarly, the flush caps 100 may include indicia indicating instructions for installation or removal of the flush caps 100.

While the flush cap 100 has been described with regard to the incorporation of the valve body 210, it is understood that the flush cap 100 could be utilized with a variety of valves, plumbing, and hydraulic systems. For example, the flush cap 100 may be utilized with valves for shower heads, faucets, spray handles, spas, toilets, hot tubs, tubs, steam generators, pressure washers, sinks, mono-block lavatory faucets, bridge style kitchen faucets, bathfill faucets, and other similar systems and devices.

The flush cap 100 and the valve body 210 may be constructed of various materials such as brass, aluminum, plastic, polymeric material, thermoset, polymeric-based blends, polymer, nylon, rubber, synthetic rubber, polyvinyl chloride, polytetrafluoroethylene, ceramic, ceramic blend, ceramic-metallic blend, alumina, metallic blend, zinc, alloy, brass, aluminum, steel, or any other suitable material such that The flush cap 100 and the valve body 210 may be tailored for a target application.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

While the flush cap 100 and the valve body 210 have been referenced to control a supply of fluid, it is understood that water, air, or other similar fluids could be controlled through the use of The flush cap 100 and the valve body 210.

The construction and arrangement of the elements of the flush cap 100 and all other elements and assemblies as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Other substitutions, modifications, changes and omissions may also be made in the design, operating conditions and arrangement of the various exemplary embodiments without departing from the scope of the present invention. For example, any element (e.g., flow restrictor, compact flow restrictor, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A flush cap for a valve body, the flush cap comprising: a substantially flat base having opposite first and second sides; an annular inlet portion, extending from the first side and configured to engage a bore in the valve body, the annular inlet portion including an inlet bore and a tab; and an annular outlet portion extending from the second side, wherein the annular outlet portion includes an outlet bore that is in fluid communication with the inlet bore; wherein the tab extends from an outer surface of the annular inlet portion in a radial direction relative to a longitudinal axis of the annular inlet portion; and wherein the tab is configured to selectively engage the valve body to detachably couple the flush cap to the valve body.

2. The flush cap of claim 1, wherein the flush cap is rotatable about the longitudinal axis relative to the valve body to engage and disengage the tab from the valve body to couple and decouple the flush cap from the valve body.

3. The flush cap of claim 1, further comprising an annular rib extending around the outer surface of the annular inlet portion between the substantially flat base and the tab.

4. The flush cap of claim 3, wherein the annular rib is elastically deformable, such that the valve body deforms the annular rib to form a seal between the annular rib and the valve body when the flush cap is coupled to the valve body.

5. The flush cap of claim 4, wherein the annular rib is a thread pattern extending around the outer surface of the annular inlet portion between the substantially flat base and the tab.

6. The flush cap of claim 1, wherein the longitudinal axis intersects a portion of the annular outlet portion.

7. The flush cap of claim 6, further comprising a projection extending axially outward from the second side of the substantially flat base; wherein the projection is graspable to cause a rotation of the flush cap in the valve body.

8. The flush cap of claim 7, wherein the annular inlet portion includes at least two tabs disposed on opposite sides thereof; and wherein causing a rotation of the flush cap does not require the use of any tools.

9. A valve assembly, comprising:
a valve body defining a bore configured to dispense a fluid; and
a flush cap configured to detachably engage the valve body, the flush cap including:
a substantially flat base having opposite first and second sides;
an annular inlet portion extending from the first side and configured to engage the bore of the valve body, the annular inlet portion including an inlet bore and a tab that extends from an outer surface of the annular inlet portion in a radial direction relative to a longitudinal axis of the annular inlet portion; and
an annular outlet portion extending from the second side;
wherein the annular outlet portion includes an outlet bore that is in fluid communication with the inlet bore; and
wherein the flush cap is rotatable relative to the valve body about the longitudinal axis between a locked position, in which the tab engages a recess of the valve body to couple the flush cap to the valve body, and a non-locked position, in which the flush cap is decoupled from the valve body.

10. The valve assembly of claim 9, wherein the flush cap further includes an annular rib extending around the outer surface of the annular inlet portion between the substantially flat base and the tab.

11. The valve assembly of claim 10, wherein the annular rib is elastically deformable, such that the valve body deforms the annular rib to form a seal between the annular rib and the valve body when the flush cap engages the bore of the valve body.

12. The valve assembly of claim 11, wherein the annular rib is a thread pattern extending around the outer surface of the annular inlet portion between the substantially flat base and the tab.

13. The valve assembly of claim 9, wherein a portion of the annular outlet portion is coincident with the longitudinal axis.

14. The valve assembly of claim 13, wherein the flush cap further includes a projection extending from the second side of the substantially flat base
wherein the projection is graspable to cause a rotation of the flush cap in the valve body.

15. The valve assembly of claim 14, wherein the annular inlet portion includes at least two tabs disposed on opposite sides thereof; and
wherein causing a rotation of the flush cap does not require the use of any tools.

16. A flush cap for installing in a valve body, the flush cap comprising: a substantially flat base having opposite first and second sides, the second side including a projection; an annular inlet portion extending from the first side and configured to engage a bore in the valve body, the annular inlet portion including an inlet bore and a tab; and an annular outlet portion extending from the second side; wherein the annular outlet portion includes an outlet bore that is in fluid communication with the inlet bore; wherein the projection is graspable to cause a rotation of the flush cap in the valve body; wherein causing a rotation of the flush cap does not require the use of any tools; wherein the tab extends from an outer surface of the annular inlet portion in a radial direction relative to a longitudinal axis of the annular inlet portion;

and wherein the tab is configured to selectively engage the valve body to detachably couple the flush cap to the valve body.

17. The flush cap of claim 16, wherein a portion of the outlet bore is coincident with a portion of the inlet bore.

18. The flush cap of claim 16, wherein the annular inlet portion further comprises a second tab extending from the outer surface of the annular inlet portion in a radial direction relative to the longitudinal axis of the annular inlet portion;
   wherein the second tab is angularly displaced one-hundred and eighty degrees from the tab.

19. The flush cap of claim 16, further comprising a plurality of annular ribs extending around the outer surface of the annular inlet portion between the substantially flat base and the tab; and
   wherein the plurality of annular ribs are elastically deformable, such that the valve body deforms the plurality of annular ribs to form a seal between the plurality of annular ribs and the valve body when the flush cap engages the bore of the valve body.

* * * * *